United States Patent
Nakagawa et al.

(10) Patent No.: US 11,952,011 B2
(45) Date of Patent: Apr. 9, 2024

(54) DEVICES AND METHODS FOR DIGITALLY COMBINING MULTIPLE ACCESS KEYS AND LOCATIONS

(71) Applicant: Toyota Motor Engineering & Manufacturing North America, Inc., Plano, TX (US)

(72) Inventors: Masashi Nakagawa, Sunnyvale, CA (US); Seisuke Kasaoki, Plano, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 512 days.

(21) Appl. No.: 17/195,398

(22) Filed: Mar. 8, 2021

(65) Prior Publication Data

US 2022/0281474 A1 Sep. 8, 2022

(51) Int. Cl.
*B60W 60/00* (2020.01)
*H04W 12/04* (2021.01)
*H04W 12/06* (2021.01)
*H04W 12/08* (2021.01)

(52) U.S. Cl.
CPC .......... *B60W 60/001* (2020.02); *H04W 12/04* (2013.01); *H04W 12/06* (2013.01); *H04W 12/08* (2013.01)

(58) Field of Classification Search
CPC ............... B60W 60/001; H04W 12/04; H04W 12/06; H04W 12/08; H04W 12/068; H04W 12/63; G07C 2009/00865; G07C 9/28; G07C 2009/00507; G07C 2209/63; G07C 9/00309; G07C 9/20; G06F 21/44; H04L 9/3213; H04L 9/3226

USPC ....................................................... 701/1, 23
See application file for complete search history.

(56) References Cited

U.S. PATENT DOCUMENTS

| | | | | |
|---|---|---|---|---|
| 9,311,656 B2* | 4/2016 | Barnes, Jr. | ............. | G06Q 30/08 |
| 9,893,774 B2* | 2/2018 | Shattil | ................... | H04W 24/00 |
| 9,912,659 B1* | 3/2018 | Widdows | ............ | H04L 63/0846 |
| 9,996,999 B2* | 6/2018 | Conrad | ............. | G07C 9/00174 |
| 10,321,314 B2* | 6/2019 | Ishibashi | ................. | G06F 7/588 |
| 10,733,607 B2* | 8/2020 | Weiss | ................... | G06F 21/6245 |
| 10,832,245 B2* | 11/2020 | Weiss | ................... | G06Q 20/382 |

(Continued)

FOREIGN PATENT DOCUMENTS

| | | | | |
|---|---|---|---|---|
| EP | 3109834 A1 * | 12/2016 | .......... | G06F 3/0488 |
| EP | 3103246 B1 * | 12/2017 | .......... | G06F 11/3051 |

*Primary Examiner* — Jaime Figueroa
(74) *Attorney, Agent, or Firm* — Snell & Wilmer LLP

(57) ABSTRACT

Methods and devices for digitally combining multiple access or entry enabling items or keys and/or location data of multiple destinations. A device may wirelessly communicate with a plurality of access control devices. The access control devices may individually authenticate a digital key of a plurality of digital keys identifiable by key identification data stored in a memory of the device. The device may further include a processor. The processor may be configured to determine that the digital key is authenticated by one of the access control devices. The processor may be further configured to communicate with the one access control system to prompt the one access control system to allow access to a user of the device. The processor may be further configured to communicate the location data to a navigation system. The processor may be further configured to transmit access tokens and/or location data to other devices.

20 Claims, 5 Drawing Sheets

(56) References Cited

U.S. PATENT DOCUMENTS

| | | | |
|---|---|---|---|
| 10,878,649 B2* | 12/2020 | Shin | G06F 21/44 |
| 11,042,816 B2* | 6/2021 | Zaid | G06F 21/35 |
| 11,164,411 B2* | 11/2021 | Kuenzi | G07C 9/00904 |
| 11,244,524 B2* | 2/2022 | Ho | G07C 9/00571 |
| 11,295,563 B2* | 4/2022 | Kuenzi | G07C 9/00309 |
| 11,373,467 B2* | 6/2022 | Jonsson | G07C 9/00174 |
| 2009/0167485 A1* | 7/2009 | Birchbauer | G07C 9/20 340/5.2 |
| 2011/0112969 A1* | 5/2011 | Zaid | G06F 21/35 701/2 |
| 2012/0086549 A1* | 4/2012 | Barnes, Jr. | G06Q 20/04 340/5.61 |
| 2013/0331027 A1* | 12/2013 | Rose | H04W 12/069 455/41.1 |
| 2013/0340129 P1* | 12/2013 | Mazzardis | A01H 5/08 Plt./157 |
| 2014/0096216 A1* | 4/2014 | Weiss | G07C 9/257 726/7 |
| 2014/0239647 A1* | 8/2014 | Jadallah | E05C 19/002 292/137 |
| 2014/0292481 A1* | 10/2014 | Dumas | G07C 9/28 340/5.61 |
| 2015/0222517 A1* | 8/2015 | McLaughlin | H04L 9/006 713/171 |
| 2015/0228134 A1* | 8/2015 | Tehranchi | G06F 21/604 340/5.61 |
| 2015/0244430 A1* | 8/2015 | Shattil | H04L 41/0816 370/254 |
| 2015/0270882 A1* | 9/2015 | Shattil | H04B 7/024 370/329 |
| 2015/0347734 A1* | 12/2015 | Beigi | H04L 9/3268 726/28 |
| 2015/0382190 A1* | 12/2015 | Canoy | H04W 12/33 726/4 |
| 2016/0035163 A1* | 2/2016 | Conrad | G07C 9/00309 340/5.61 |
| 2016/0094318 A1* | 3/2016 | Shattil | H04B 7/0697 375/267 |
| 2018/0009416 A1* | 1/2018 | Maiwand | G07C 9/00309 |
| 2019/0228383 A1* | 7/2019 | Abler | G06Q 10/20 |
| 2019/0260590 A1* | 8/2019 | Kuenzi | H04W 12/08 |
| 2019/0260660 A1* | 8/2019 | Abuan | H04W 12/04 |
| 2019/0287329 A1* | 9/2019 | Jonsson | G07C 9/00174 |
| 2020/0034850 A1* | 1/2020 | Weiss | G06Q 20/3674 |
| 2020/0226611 A1* | 7/2020 | Weiss | G06Q 30/06 |
| 2020/0314651 A1* | 10/2020 | Pirch | H04W 12/06 |
| 2021/0209875 A1* | 7/2021 | Kuenzi | H04B 4/80 |
| 2021/0319639 A1* | 10/2021 | Ho | G06F 21/31 |
| 2022/0166700 A1* | 5/2022 | Abuan | G06F 21/445 |

* cited by examiner

DEVICES AND METHODS FOR DIGITALLY COMBINING MULTIPLE ACCESS KEYS AND LOCATIONS

BACKGROUND

1. Field

The present disclosure is directed to methods and devices for digitally combining multiple access or entry enabling items and/or location data of multiple destinations.

2. Description of the Related Art

In one's daily life, there may be a need to access more than one place, location, object, or item (e.g., a vehicle, a house, a hotel room, a mailbox, a public transportation vessel). Access generally requires at least one entry enabling item (e.g., mechanical key, security code, key fob, access card, remote control, clicker, ticket, etc.) for each access device or point. Carrying multiple entry enabling items physically on one's person may create unwanted bulk, lead to one losing, misplacing, or forgetting the items, and cause difficulty in identifying the correct key for a given access device or point. Further, providing the entry enabling items to others (e.g., for vacation rentals, for car rentals, for hotel check-ins, etc.) may require having to make copies and/or physically delivering them, which may be inefficient, expensive, and cumbersome. One traveling to more than one destination for access may find it difficult to identify and locate the planned destinations and plan a route, especially if one is unfamiliar with the destinations and/or the region of the destinations in general.

As such, there is a need for methods and devices for combining multiple access keys into a single portable device and combining location data of multiple destinations for transportation.

SUMMARY

Devices and methods for obtaining access through multiple access control systems and/or accessing multiple areas. A device may have a wireless transceiver that can communicate with each of the access control systems. The device may receive key identification data from one of the access control systems. The device may further have a memory that stores authentication data. The device may further have a processor coupled to the wireless transceiver and the memory. The processor may determine that the received key identification data matches the authentication data. The processor may then transmit the authentication data to one of the access control systems via the wireless transceiver. Upon transmission of the authentication data, one of the access control systems may allow access to a user of the device.

In accordance with an embodiment of the present disclosure, there may be a portable digital access device that has a wireless transceiver configured to exchange information with a plurality of access control systems. The information may include key identification data and authentication data. The authentication data may have a plurality of keys for one or more of the plurality of access control systems. The key identification data may identify one or more of the plurality of keys complementing one of the plurality of access control systems. The device may have a memory configured to store the authentication data. The device may have a processor coupled to the wireless transceiver and the memory. The processor may be configured to determine that the authentication data matches the key identification data received from one of the plurality of access control systems. The processor may be further configured to transmit the authentication data to one of the plurality of access control systems by controlling the wireless transceiver to prompt one of the plurality of access control systems to allow access to a user of the portable digital access device. The one of the plurality of access control systems may be a lock, a ticket reader, a gate, or a direction indicator.

The memory may be further configured to store location data of the plurality of access control systems. The processor may be further configured to transmit the location data to a navigation system by controlling the wireless transceiver to navigate the user to the plurality of access control systems. The wireless transceiver may exchange information with servers. The servers may be configured to store location data of the plurality of access control systems. The servers may be further configured to transmit the location data to the navigation system to navigate the user to the plurality of access control systems upon the processor determining that the authentication data matches the key identification data.

The processor may be further configured to transmit the authentication data to other portable digital access devices by controlling the wireless transceiver upon receiving input from the user. The process may be further configured to receive the authentication data from the servers. The processor may be further configured to set a timer to count to a predetermined time and remove the authentication data from the memory when the timer reaches the predetermined time.

In accordance with an embodiment of the present disclosure, there may be a method for obtaining access through a plurality of access control systems. The method may include receiving, by a wireless transceiver, key identification data from the plurality of access control systems. The key identification data may associate a digital key of a plurality of digital keys with one of the plurality of access control systems. The method may further include determining, by a processor, that authentication data having the plurality of digital keys and stored in a memory matches the identification data. The method may further include transmitting, by the wireless transceiver, the authentication data to the plurality of access control systems to prompt the plurality of access control systems to provide access. The method may further include inputting, by an inputting device, the key identification data. The method may further include generating, by the processor or servers, the authentication data based on the key identification data.

The method may further include transmitting, by servers, location data of the plurality of access control systems to a navigation system to provide directions to the plurality of access control systems. The method may further include transmitting, by the wireless transceiver, location data of the plurality of access control systems stored in the memory to a navigation system to provide directions to the plurality of access control systems. The method may further include transmitting, by the wireless control sensor, location data of the plurality of access control systems to an electronic control unit (ECU) of a vehicle with self-driving capabilities. The method may further include prompting the vehicle to drive, by the ECU, to the plurality of access control systems.

The method may further include transmitting, by the wireless transceiver, a copy of the authentication data to be used as an access token. The method may further include setting a timer, by the processor, to count to a predetermined time. The method may further include removing the authentication data from the memory when the timer reaches the predetermined time.

In accordance with an embodiment of the present disclosure, there may be a method for accessing a plurality of areas. The method may include receiving, by a wireless transceiver, location data of the plurality of areas. The method may further include storing, by a memory, the location data. The method may further include determining, by a processor, that a vehicle is started. The method may further include transmitting, by the wireless transceiver, the location data to a navigation system. The vehicle may have self-driving capabilities, and the navigation system may be coupled to an ECU of the vehicle. The method may further include initiating, by the processor, the vehicle to drive, by the ECU, to the plurality of areas based on the location data. The method may further include transmitting, by the wireless transceiver, the location data to one or more portable devices capable of storing the location data and transmitting the location data to other navigation systems.

The method may further include receiving, by the wireless transceiver, one or more access tokens for areas having access control systems of the plurality of areas. The method may further include storing, by the memory, the one or more access tokens. The method may further include transmitting, by the wireless transceiver, the one or more access tokens to the access control systems to gain access. The method may further include receiving, by the wireless transceiver, one or more access tokens for one or more access control systems. The method may further include storing, by the memory, the one or more access tokens to the access control systems to gain access. The one or more access control systems may be a lock, a ticket reader, a gate, or a direction indicator.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Figure 1:
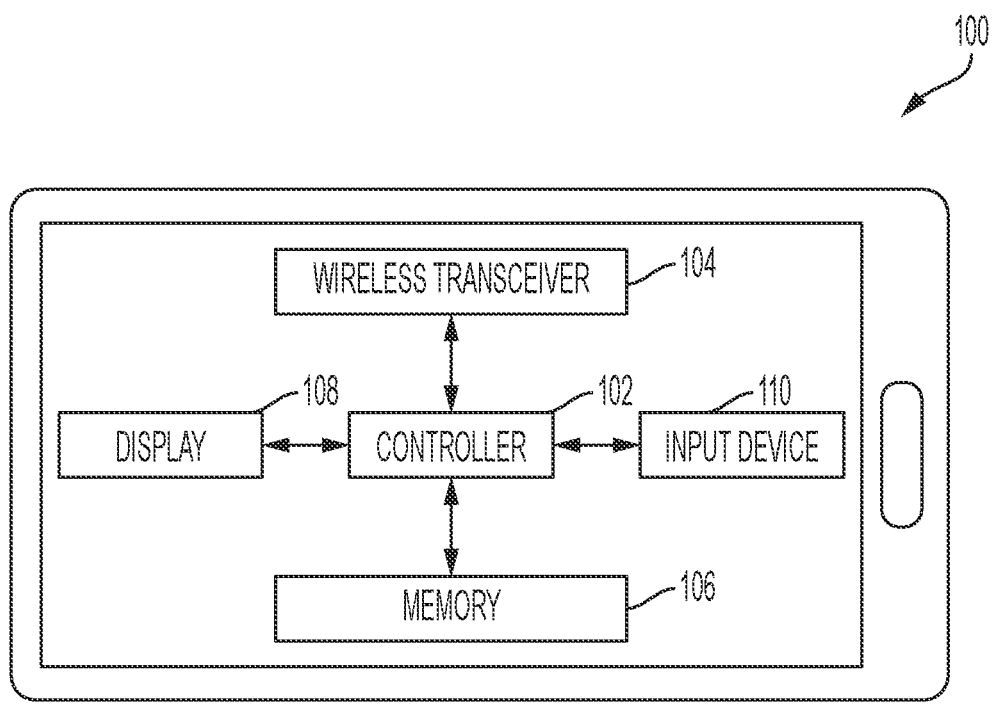
FIG. 1 illustrates a block diagram of a device for combining multiple access keys and location data of multiple destinations according to an aspect of the present disclosure.

The methods and devices described herein digitally combines multiple access or entry enabling items (e.g., mechanical keys, security codes, key fobs, access cards, remote controls, clickers, tickets, etc.) and location data of multiple destinations (e.g., points of interest, delivery addresses, etc.). Entry enabling items may be referred to as "keys" hereinafter. Combining the keys and location data of destinations may advantageously provide an efficient and secure management of the keys and trips. By combining keys of various shapes, sizes, and mediums into a single digital device (e.g., a handheld electronic device such as a smartphone), one may reduce clutter carried on one's person, help avoid losing, misplacing, or searching for the items, and streamline travel. The keys may be associated with the combined destinations. For example, one of the combined keys may be a hotel room key for a hotel that is located at one of the destinations. In another example, one of the keys may be a ticket for a show or a sporting event that may be located at another one of the destinations. In another example, one of the combined keys may open a mailbox that is located at one of the destinations. An autonomous or semi-autonomous vehicle with self-driving capabilities may be unlocked and started with one of the combined keys, and the combined location data may be uploaded to the vehicle for the vehicle to begin autonomous or-semi autonomous travel to the destinations. The term "driver" may be interchanged with "passenger" when referring to autonomous or semi-autonomous vehicles.

An exemplary device may include a wireless transceiver that can exchange information with multiple access control systems. The term "access control device(s)" can be used in place of "access control system(s)" throughout this disclosure. The information may include key identification data and authentication data. The authentication data may have multiple keys for one or more of the access control systems. The key identification data may identify one or more of the keys complementing one of the access control systems. The device may further include a memory configured to store the authentication data. The device may further include a processor coupled to the wireless transceiver and the memory. The processor may be configured to determine that the authentication data matches the key identification data received from one of the access control systems. The processor may be further configured to transmit the authentication data to one of the access control systems by controlling the wireless transceiver to prompt one of the access control systems to allow access to a user of the device and anyone else in the user's company. The processor may be further configured to transmit location data stored in the memory to a navigation system or prompt servers of the access control systems to transmit location data to the navigation system upon determining that the authentication data matches the key identification data. The navigation system may be coupled to an ECU of a vehicle with self-driving capabilities, and the transmission of the location data may prompt the ECU to drive the vehicle based on the location data. The processor may be further configured to transmit expiring or non-expiring access tokens and/or location data to other devices.

FIG. 1 illustrates a block diagram of a device 100 for combining multiple access keys and location data of multiple destinations according to an aspect of the present disclosure. The device 100 may be a portable device with wireless connectivity capabilities. The device 100 may be a mobile phone as shown in FIG. 1. The device 100 may also be a tablet device, a laptop computer, a key fob, a car key, a clicker, an access card, a portable multimedia player, a portable gaming device, and any other portable electronic and electro-mechanical device. The device 100 may be shaped, sized, and weighed to be held and transported with ease. For example, the device 100 may fit into a pocket. The device 100 may include a controller 102, a wireless transceiver 104, a memory 106, a display 108, and an input device 110.

The controller 102 may be one or more integrated circuits configured to control and manage the operations of the device 100. The controller 102 may include one or more processors configured to execute machine-readable instructions. The one or more processors may be microprocessors or microcontrollers by example. The controller 102 may be coupled to the wireless transceiver 104, the memory 106, the display 108, and the input device 110.

The wireless transceiver 104 may include but not be limited to a Bluetooth, an infrared (IR), a radio frequency (RF), or a WiFi based communication hardware. In some embodiments, some or all of the aforementioned communication methods may be available for selection of a user of the device 100 based on preference or suitability (e.g., signal travel distance, signal availability, signal interference, signal travel speed, etc.). The wireless transceiver 104 may utilize another wireless communication technology appreciated by one of ordinary skill in the art.

The memory 106 may be a random-access memory (RAM), a disk, a flash memory, optical disk drives, hybrid memory, or any other storage medium that can store data. The memory 106 may store program code that are executable by the controller 102. The memory 106 may store data in an encrypted or any other suitable secure form.

The display 108 may be a liquid crystal display (LCD), a light-emitting diode display (LED), an organic light emitting diode (OLED), a plasma display, a cathode-ray tube (CRT) display, a digital light processing display (DLPT), a microdisplay, a projection display, or any other display appreciated by one of ordinary skill in the art. The display 108 may display user interfaces, text, images, and/or the like. The display 108 may be a touchscreen and combined or integrated with the input device 110.

The input device 110 may receive visual, auditory, and/or touch input. For example, the input device 110 may be a camera, a microphone, a touchscreen, a button, or a remote. The user of the device 100 may input commands and information into the input device 110 to control the controller 102. For example, the input device 110 may receive biometric information, the user's voice, and/or the user's touch input with one or more fingers.

Figure 2:
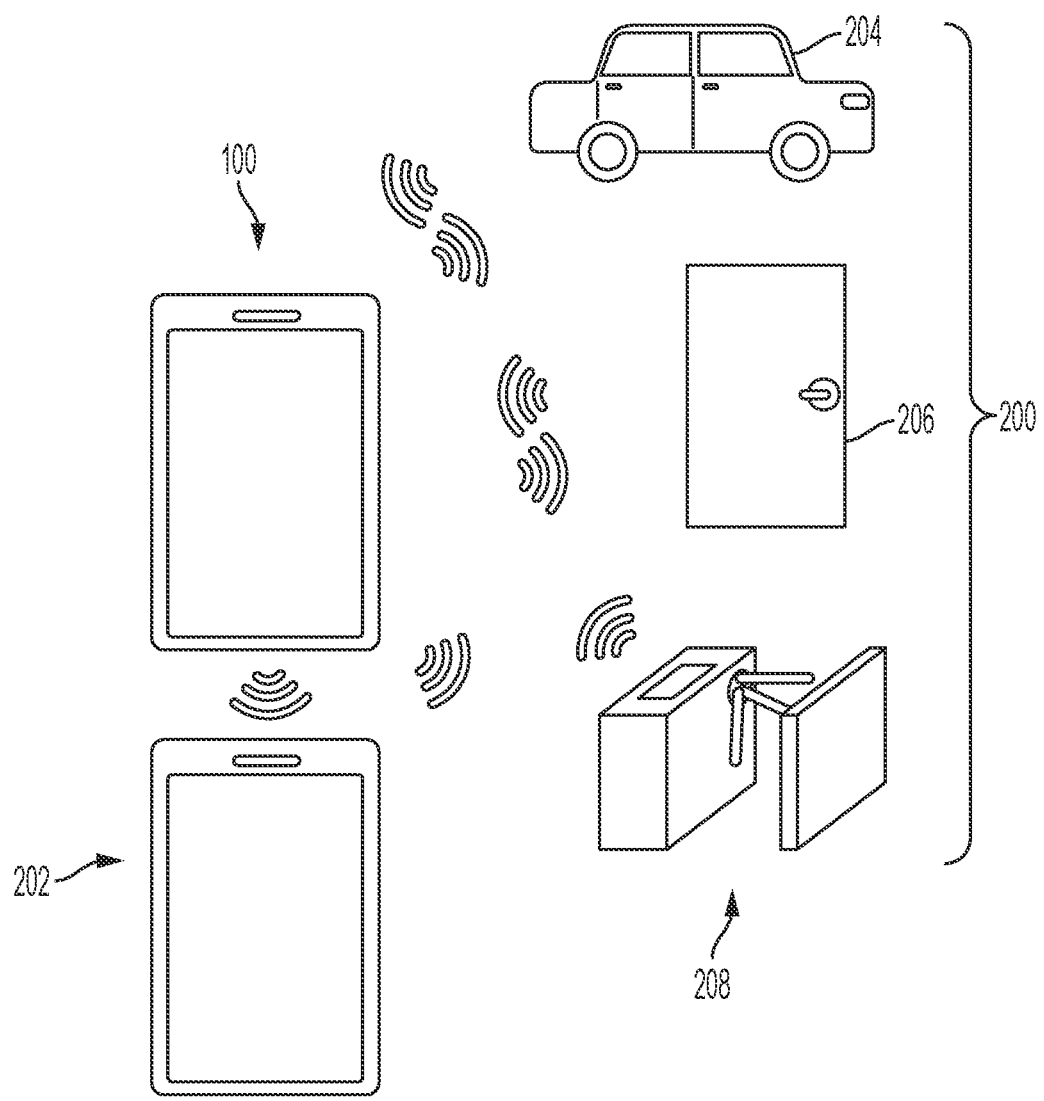
FIG. 2 illustrates the device of FIG. 1 communicating with a plurality of access control systems to provide access to a user of the device and transferring information to a second device to provide the second device with access and/or navigation capabilities according to an aspect of the present disclosure.

FIG. 2 illustrates the device 100 communicating with a plurality of access control systems 200 to provide access to a user of the device 100 and transferring information to a second device 202 to provide the second device 202 with access and/or navigation capabilities according to an aspect of the present disclosure. The term "access control systems" may be replaced with "access control devices" throughout this disclosure. The access control systems 200 may be any electronic, mechanical, or electromechanical machine, structure, device, and/or the like that bars, controls, observes, and/or regulates entry or access to a point beyond it. For example, the access control system 200 may be a vehicle lock system 204, a door lock 206, or a tourniquet 208. Other examples include but are not limited to security gates, ticket checkpoints (e.g., public transportation, movies, shows, sporting events), mailboxes, delivery lockers, electronic device lock screens, and direction indicators configured to switch the path of the user to an authorized path (e.g., a designated booth). The access control systems 200 may each have a transceiver to wirelessly exchange information with the device 100. The transceiver may include but not be limited to a Bluetooth, an infrared (IR), a radio frequency (RF), or a WiFi based communication hardware. In some embodiments, the access control systems 200 may have an inlet in addition to or in lieu of the wireless transceiver. The inlet may enable the device 100 to be physically inserted and coupled to the access control systems 200 to exchange information. In addition, the access control systems 200 may have mechanical locks, keypads, proximity readers, biometric scanners, quick response (QR) code scanners, and/or the like that have functionality irrespective of interaction with the device 100.

The device 100 may exchange authentication and identification information with each of the access control systems 200. The access control systems 200 may authenticate and authorize the device 100 to allow or enable access to its user through the information exchange. Allowing or enabling access may be, for example, unlocking a lock, opening a gate, clearing a checkpoint, or starting a vehicle. More specifically, the device 100 may receive a key identification data from one of the access control systems 200, and the device 100 may check whether the key identification data identifies any of the keys in authentication data stored in or accessible by the device 100. If an identification occurs, the device 100 may transmit the authentication data to the same access control system 200 to allow or enable its user access. The device 100 may allow or enable its user access to multiple access control systems 200 one-by-one or simultaneously.

The device 100 may further transmit location data of the access control systems 200 or any other location of interest stored in or accessible by the device 100 to a navigation system. Through the location data, a route may be planned for the user to travel to the access control systems 200 and the other locations of interest. The user may then use the navigation system and/or the self-driving features of a vehicle to travel the route.

The device 100 may transmit access tokens, or the authentication data and/or the location data, to the second device 202. The second device 202 may allow a second user to have the same access and travel features of the device 100. In some embodiments, the second device 202 may have such features for a limited time only, meaning the transmitted data is erased or the features are disabled after a predetermined time has elapsed. Whether the access tokens expire and, if so, the predetermined time limit may be determined by the user of the device 100 or a third party with some control over the access control systems 200 (e.g., travel agent, vehicle rental company, delivery business, etc.). The second device 202 may be used to duplicate the device 100 by copying the authentication data of the device 100. The second device 202 may also be used to replace the device 100 by transferring the authentication data of the device 100, meaning the device 100 no longer has the authentication data stored after the transfer is complete. The user may choose to selectively copy or transfer the authentication data such that only one or some keys are accessible by the second device 202 as opposed to all keys. There may be devices in addition to the second device 202 that has the functionality of the second device 202.

Figure 3:
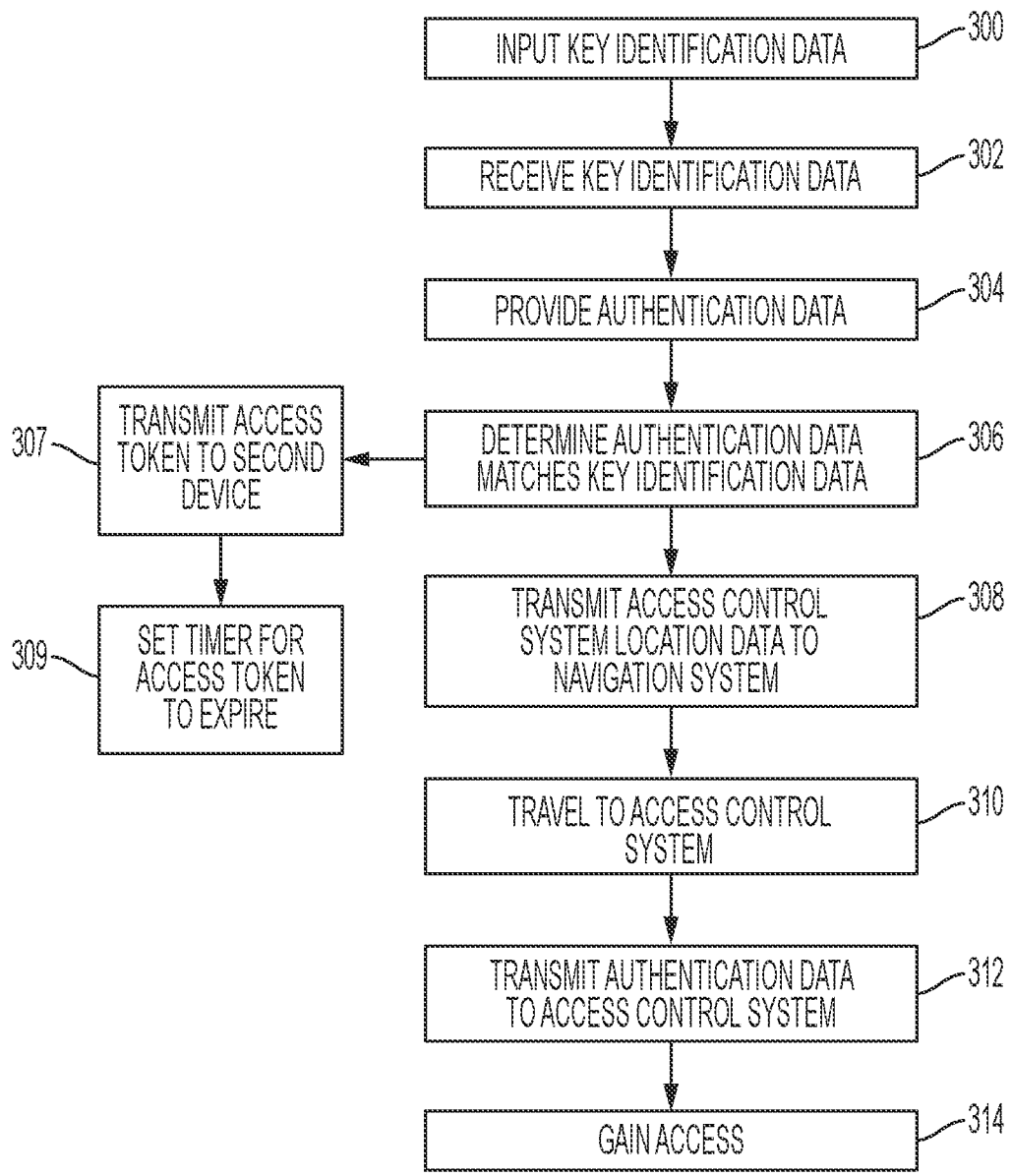
FIG. 3 illustrates a flow chart of a method for combining multiple access keys and location data of multiple destinations according to an aspect of the present disclosure.

FIG. 3 illustrates a flow chart of a method for combining multiple access keys and location data of multiple destinations according to an aspect of the present disclosure. The method may be performed with the device 100 of FIGS. 1-2 and the second device 202 of FIG. 2. In block 300, the method may begin by inputting key identification data that is communicated with the device 100.

The key identification data may be data that distinguishes keys from each other. The key identification data may provide information as to key-access control system 200 pairings. In some embodiments, more than one key may be associated with a particular access control system 200. As such, a plurality of keys may be required to unlock the access control system 200 or allow user access. There may be an order of using the keys in such embodiments. For example, an access control system 200 may require keys A and B to allow access where key A must be used before key B. The key identification data may be a code or series of codes. The key identification data may be in the form of a series of numbers, letters, symbols and/or characters. The user may input the key identification data using a keyboard, a mouse, a keypad, a touchpad, or any other input hardware appreciated by one of ordinary skill in the art. The user may input the key identification data via the input device 110 of the device 100. The user may also input the key identification data via input devices of the access control systems 200. The user may also input the key identification data via a third device, such as a smartphone, a computer, and the like. In some embodiments, the user may receive the key identification data directly or from a management server of each access control system 200 or a third party with some control over the access control systems 200 (e.g., travel agent, vehicle rental company, delivery business, etc.). In such embodiments, the step of block 300 may be skipped, and the method may begin with block 302.

In block 302, the device 100 may receive the key identification data. The key identification data may be the key identification data inputted in block 300. Alternately, the key identification data may be transmitted by each of the access control systems 200. In some embodiments, the key identification data may be downloaded from a server. The server may be a management server of an access control system 200. In some embodiments, the key identification data may be transmitted directly via a wireless transceiver of an access control system 200. The device 100 may then receive the transmitted key identification data via the wireless transceiver 104. A wireless pairing between the device 100 and the particular access control system 200 being attempted to get accessed may be required before beginning data transmission. For example, the device 100 and the access control system 200 may have to be paired via Bluetooth or be in the same WiFi network. The key identification data may be encrypted and/or otherwise secured such that it cannot be easily understood or deciphered. The key identification data may be encrypted during transmission and decrypted once received. In some embodiments, the key identification data may be transmitted directly via a wired connection between an access control system 200 and the device 100. Once the key identification data is received by the device 100, the method may continue with block 304.

In block 304, authentication data may be provided to the device 100. The authentication data may be one or more virtual keys configured to authenticate the device 100 to one or more access control systems 200. Authentication of the device 100 prompts the one or more access control systems 200 to allow access to the user of the device 100. In some embodiments, multiple keys may be required to authenticate the device 100 for a single access control system 200. Each key of the authentication data may be a code or series of codes. The code may be in the form of a series of numbers, letters, symbols and/or characters. The authentication data may be encrypted and/or otherwise secured such that it cannot be easily understood or deciphered. The authentication data may be encrypted during transmission and decrypted once received. The authentication data may be stored in the memory 106 of the device 100 or on the cloud. For example, the user may be provided the device 100 with the authentication data pre-installed by a travel agent, the authentication data containing at least one key associated with airplane tickets, a rental car key, a hotel access card, and a music concert. In another example, a travel agent may provide a download file accessible from a server to be downloaded by the device 100, the file containing authentication data for the user's access to transportation and points of interest. In some embodiments, the authentication data may be generated rather than stored. The generated authentication data may be random. A code may be inputted into one of the access control systems 200 that triggers the transmission of the authentication data to the device 100. For example, the authentication data may be generated in response to the key identification data inputting step of block 300. In some embodiments, a code may be inputted into the device 100 via the input device 110 that generates the authentication data. Such a code may be provided to the user by a third party with some control over the access control systems 200 (e.g., travel agent, vehicle rental company, delivery business, etc.). Once generated, the authentication data may be temporarily stored in the memory 106 or the cloud. The authentication data may be automatically deleted once successfully used to gain access or after a predetermined time limit has been reached. After the authentication data is provided to the device 100, the method may continue with block 306.

In block 306, the processor(s) of the controller 102 of the device 100 may determine that the key identification data matches with the authentication data. The processor(s) may make his determination by, for example, comparing the key identification data to the authentication data. There may be a match if the key identification data and the authentication data are the same. Alternately, there may be a match if the key identification data and the authentication data complement each other (e.g., shapes that fit together, phrases that complete each other, etc.). If the device 100 receives a key identification data for a particular access control system 200 that it cannot locate or generate authentication data for, that access control system 200 may not allow the user access. Once the determination that the authentication data matches the key identification data is made, the method may continue with block 308. In some embodiments, the method may also continue with block 307.

In block 307, the device 100 may transmit the authentication data to a second device 202 as an access token. The device 100 may send access tokens to more than one device. The second device 202 may have the same or similar functionality and principles of operation as the device 100. For example, the second device 202 may have components configured to execute steps executed by the device 100 of the method shown in FIG. 3. The access token may enable the second device 202 to be authenticated by one of the access control systems 200 to provide access to a user of the second device 202. A single access token may only work for a single access control system 200. The device 100 may send more than one access token to the second device 202 if access to more than one access control systems 200 is desired. The transmission of the access token may be performed between the wireless transceiver 104 of the device 100 and that of the second device 202. A pairing may be required prior to data transmission. For example, the device 100 and the second device 202 may have to be paired via Bluetooth or be in the same WiFi network. The access token may be encrypted and/or otherwise secured such that it cannot be easily understood or deciphered. The access token may be encrypted during transmission and decrypted once received. In some embodiments, the data transmission may be via a wired connection. In some embodiments, the data transmission may require a third device (e.g., a personal computer, a tablet, etc.) as an intermediary device to facilitate the data transmission.

In block 309, a timer may be set for the transmitted access token to expire. The timer may be set to a predetermined time duration. For example, the timer may be set to a predetermined number of seconds, minutes, hours, days, months, or years. Alternately, the timer may be set to a predetermined time. For example, the timer may be set to a predetermined hour, day, month, or year. The timer may be set by the user of the device 100 or another party (e.g., travel agent, vehicle rental company, delivery business, etc.) with some control over the subject access control system 200. In some embodiments, the access token may expire once it is used by the user of the second device 202. Once the predetermined time limit expires or the access token is used, the access token may be erased from the second device 202 or the requisite authentication data may change such that the access token is no longer functional.

In block 308, the processor(s) of the controller 102 of the device 100 may transmit location data of the access control system 200 for which a matching authentication data was found in block 306 to a navigation system. For example, the device 100 may remotely receive a key identification data having a matching authentication data for a hotel room and transmit the address to the hotel to the navigation system of the user's vehicle. When there is matching authentication data for multiple access control systems 200, the navigation system may plan an efficient route passing through each of the multiple access control systems 200. The efficiency may be based on, for example, how long it takes to complete the trip or how many miles have to be traveled to complete the trip. Location data may be in the form of coordinates or an address. Location data of each access control system 200 may be stored in the memory 106 of the device 100 or accessed or downloaded through the cloud. The transmission of the location data may be wired or wireless. A wireless transmission may be performed via the wireless transceiver 104 of the device 100 and that of the navigation system or a system the navigation system is a component of (e.g., a vehicle). A pairing may be required between the two wireless transceivers. For example, a Bluetooth pairing or being in the same WiFi network may be required. The navigation system may be a portable handheld device or fixed to a vehicle. The navigation system may be projected to a display of the portable handheld device or a display of the vehicle (e.g., infotainment unit). A drawn route to the location(s) of the access control system(s) 200 and/or pins of the location(s) may be shown on a map displayed on the display. In some embodiments, route directions determined by the navigation system may provide voice directives to the user through speakers. The transmission of the location data may take place, for example, when the user unlocks, enters, or starts a vehicle. In some embodiments, the device 100 may include a location sensor, and the display 108 or speakers of the device 100 may project directions to the user instead of or in addition to transmitting the location data to another device or system with navigation capabilities. Once the navigation system determines a route for the user to take based on the transmitted location data, the method may continue with block 310.

In block 310, the user of the device 100 may travel to the access control systems 200. The user may follow the mapped route in block 308 via navigation system instructions. In some embodiments, block 308 may be skipped, and the user may independently plan a route. In some embodiments, the user may use an autonomous or semi-autonomous vehicle with self-driving capabilities, and the vehicle may drive the user to the access control systems 200 based on the transmitted location data. The user may unlock, enter, or start such a vehicle, and an ECU of the vehicle coupled to the navigation system may begin controlling the steering and acceleration functions of the vehicle based on the location data and routing of the navigation system. Information regarding conditions that affect driving such as weather, traffic, accidents, and road work may be received by sensors coupled to the ECU and evaluated by the ECU to control the steering and acceleration.

In block 312, the processor(s) of the controller 102 of the device 100 may transmit the authentication data to the subject access control system 200. The transmission may be initiated by selecting the authentication data to be transmitted via the input device 110 of the device 100. For example, a list of authentication data each identified for a particular access control system 200 may appear on the display 108 of the device 100, and the user may then make a selection. The transmission may be performed via the wireless transceiver 104 or a wired connection between the device 100 and the access control system 200. The authentication data may be encrypted and/or otherwise secured such that it cannot be easily understood or deciphered. The authentication data may be encrypted during transmission and decrypted once received. Upon receiving the authentication data, the access control system 200 may authenticate the authentication data. The authentication may be performed by one or more processors or servers of the access control system 200. In some embodiments, the authentication may be completed as soon as the access control system 200 receives the authentication data matching the key identification data. In some embodiments, the authenticity may be determined by, for example, comparing the authentication data to the authentication data stored in a memory or server of the access control system 200. There may be a match if the authentication data received and the authentication data stored are the same. Alternately, there may be a match if the authentication data received and the authentication data stored complement each other (e.g., shapes that fit together, phrases that complete each other, etc.).

In some embodiments, block 312 may be performed prior to the location data transmission step of block 308 and the traveling step of block 310. In some embodiments, the determination of key identification data-authentication data match step of block 306 may continue directly to block 312. In such embodiments, block 308 and block 310 may be skipped in executing the method.

In block 314, the device 100 may prompt the subject access control system 200 to allow access to the user via the transmitted authentication data. For example, the device 100 may unlock a door lock, unlock and/or start a vehicle, open a security gate, allow the turning of a tourniquet, clear a checkpoint, register a boarding pass, scan a show ticket, open a mail/delivery box, and/or the like. The user may choose to keep the access control system 200 accessible indefinitely or for a predetermined time and/or to provide access to his/her company.

Figure 4:
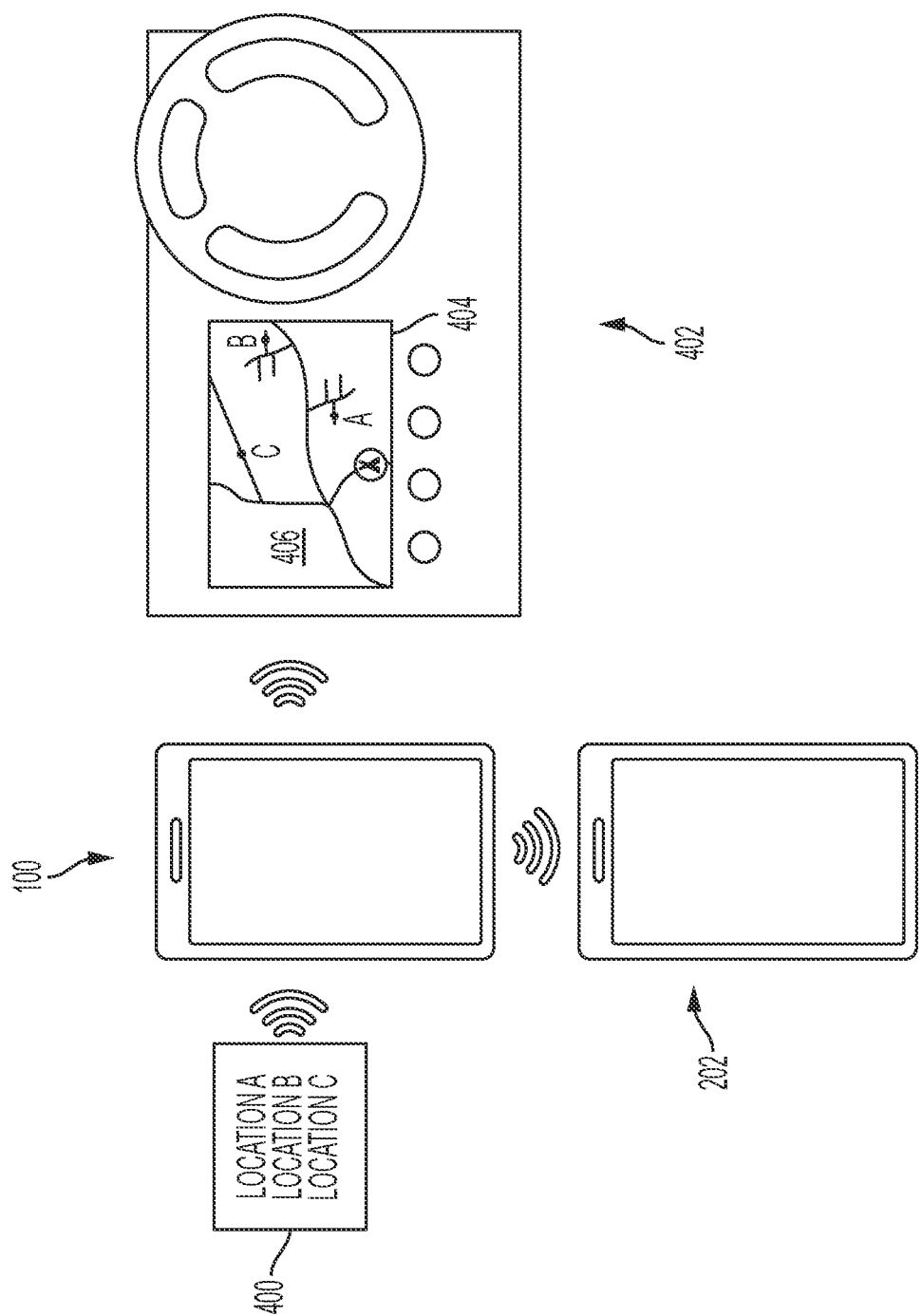
FIG. 4 illustrates the device of FIG. 1 transmitting location data of multiple destinations to a navigation system of a vehicle and transferring information to the second device of FIG. 2 to provide the second device with navigation capabilities according to an aspect of the present disclosure.

FIG. 4 illustrates the device 100 transmitting location data 400 of multiple destinations to a navigation system of a vehicle 402 and transferring information to the second device 202 to provide the second device 200 with navigation capabilities according to an aspect of the present disclosure.

The vehicle 402 is a conveyance capable of transporting a person, an object, or a permanently or temporarily affixed apparatus. The vehicle 402 may have an automatic or manual transmission. The vehicle 402 may be a self-propelled wheeled conveyance, such as a car, an SUV, a truck, a bus, a van or other motor or battery driven vehicle. For example, the vehicle 402 may be an electric vehicle, a hybrid vehicle, a plug-in hybrid vehicle, a fuel cell vehicle, or any other type of vehicle that includes a motor/generator. The vehicle 402 may be an autonomous or semi-autonomous vehicle having self-driving capabilities.

The vehicle 402 may have an ECU configured to control various components of the vehicle 402. The vehicle 402 may have a transceiver coupled to the ECU to wirelessly exchange information with the device 100. The transceiver may include but not be limited to a Bluetooth, an infrared (IR), a radio frequency (RF), or a WiFi based communication hardware. In some embodiments, the vehicle 402 may have an inlet (e.g., a universal serial bus (USB) port) in addition to or in lieu of the wireless transceiver. The inlet may enable the device 100 to be physically inserted and coupled to the vehicle 402 to exchange information. The device 100 may receive the location data 400 wirelessly via the wireless transceiver 104 or via a wired connection and/or store the location data 400 in the memory 106. The device 100 may then transmit the location data 400 wirelessly via the wireless transceiver 104 or via a wired connection to the navigation system. The transmission of the location data 400 to the navigation system may be triggered by an action involving the vehicle 402. For example, the transmission may be triggered by turning on the ignition or otherwise starting the vehicle 402. Other examples may include, unlocking the vehicle 402, via the device 100 or otherwise, opening a driver side door or any other door of the vehicle 402, or sitting on the driver seat or any other seat of the vehicle 402. The actions may be sensed by one or more sensors coupled to the ECU.

The navigation system may be a portable handheld device or fixed to the vehicle 402 as shown in FIG. 4. The navigation system may be projected to a display 404 (e.g., infotainment unit) of the vehicle 402 as shown in FIG. 4 or a display of the portable handheld device. In embodiments where the navigation system is a portable handheld device, the device may be the device 100 or communicate with the vehicle 402 like the device 100. A drawn route to the determined location(s) based on location data 400 and/or pins of the location(s) may be shown on a map 406 displayed on the display 404. For example, the navigation system may receive the location data 400 of locations A, B, and C. The navigation system may then plan a route passing through locations A, B, and C. The display 404 may then show the planned route, the locations A, B, and C, and the location of the vehicle 402 on the map 406 in real-time. In some embodiments, the navigation system may provide voice directives, such as when to turn or take a freeway exit, to the user through speakers instead of or in addition to the display 404 projection.

The navigation system may be coupled to the ECU. The ECU of the vehicle 402 may drive the user of the device 100 on the planned route and stop at all predetermined destinations based on the transmitted location data 400. The user may unlock, enter, or start such a vehicle, and an ECU of the vehicle coupled to the navigation system may begin controlling the steering and acceleration functions of the vehicle based on the location data and routing of the navigation system. Information regarding conditions that affect driving such as weather, traffic, accidents, and road work may be received by sensors coupled to the ECU and evaluated by the ECU to control the steering and acceleration.

In an exemplary application, a delivery driver may receive the location data 400 of the delivery stops he/she is assigned to make during his/her shift via the device 100. The location data 400 may then be transmitted to the navigation system of the delivery truck when the delivery driver starts the truck. The navigation system may plan a route including all the delivery stops and communicate it to the driver. The driver may then drive or be driven to the delivery stops to make the deliveries.

The device 100 may transmit the location data 400 to the second device 202. The second device 202 may allow a second user to have the same travel features of the device 100. In some embodiments, the second device 202 may have such features for a limited time only, meaning the transmitted data is erased or the features are disabled after a predetermined time has elapsed. Whether the location data 400 expires and, if so, the predetermined time limit may be determined by the user of the device 100. The second device 202 may be used to duplicate the device 100 by copying the location data 400 of the device 100. The second device 202 may also be used to replace the device 100 by transferring the location data 400 of the device 100, meaning the device 100 no longer has the location data 400 stored after the transfer is complete. The user may choose to selectively copy or transfer the location data 400 such that only one or some locations are accessible by the second device 202 as opposed to all locations. There may be devices in addition to the second device 202 that have the functionality of the second device 202 which location data 400 may be transmitted to or from the device 100.

Figure 5:
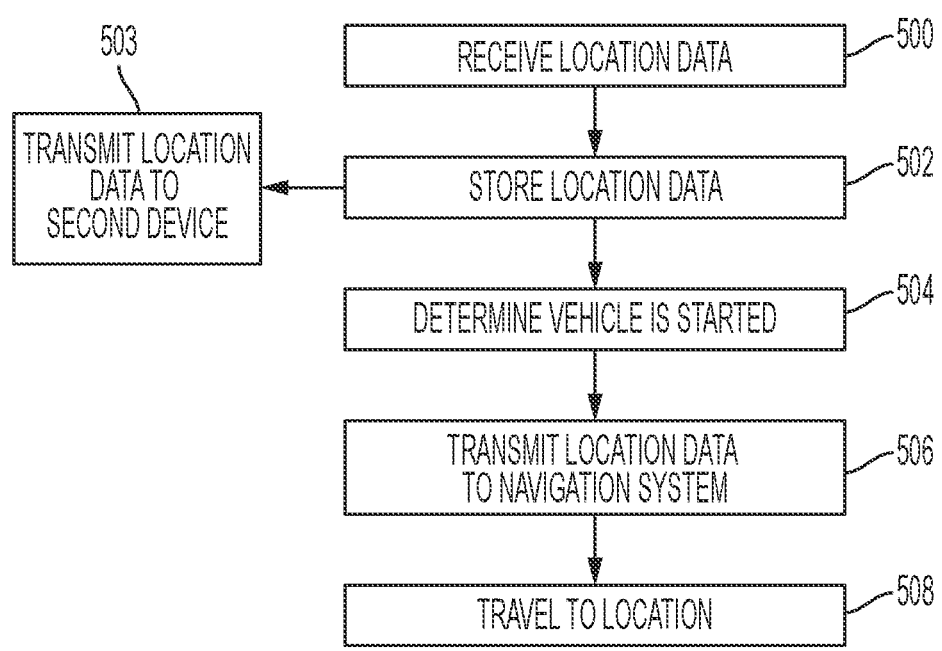
FIG. 5 illustrates a flow chart of a method for combining location data of multiple destinations and traveling to the destinations according to an aspect of the present disclosure.

FIG. 5 illustrates a flow chart of a method for combining location data of multiple destinations and traveling to the destinations according to an aspect of the present disclosure. The method may be performed with the device 100 of FIGS. 1 and 4 and the second device 202 of FIG. 4. In block 500, the method may begin by the device 100 receiving location data 400.

The location data 400 may provide location information of one or more points of interest. The one or more points of interests may be locations of the access control systems 200 of FIG. 2. The location data 400 may be in the form of coordinates or an address. The location data 400 may be encrypted and/or otherwise secured such that it cannot be easily understood or deciphered. The location data 400 may be encrypted during transmission and decrypted once received. For example, a delivery business may wirelessly send the device 100 of a delivery driver the location data 400, the location data 400 containing a location associated with each delivery, including home addresses, business addresses, P.O. box locations, delivery access points, delivery lockers, and the like. The device 100 may further receive any keys that may be necessary to access said locations as explained in FIGS. 2 and 3. In another example, a travel agent or a tourism website may prepare a download file accessible from a server to be downloaded by the device 100, the file containing locations of recommended landmarks, cultural sites, eateries, and attractions. After the location data 400 is provided to the device 100, the method may continue with block 502.

In block 502, the received location data 400 may be stored in the memory 106 of the device 100 or on the cloud. In some embodiments, the location data 400 may be pre-installed on the device 100 and the step of block 500 may be skipped. For example, the user, who may be a delivery driver, may be provided the device 100 with the location data 400 pre-installed by a delivery business, the location data 400 containing a location associated with each delivery, including home addresses, business addresses, P.O. box locations, delivery access points, delivery lockers, and the like. The device 100 may further have stored any keys that may be necessary to access said locations as explained in FIGS. 2 and 3. The location data 400 of a location may be automatically deleted once the user arrives at the location or a predetermined time limit has been reached.

In block 503, the processor(s) of the controller 102 of the device 100 may transmit the location data 400 to the second device 202. The device 100 may send the location data 400 to more than one device. The second device 202 may have the same or similar functionality and principles of operation as the device 100. For example, the second device 202 may have components configured to execute steps executed by the device 100 of the method shown in FIG. 5. The transmission of the location data 400 may be performed between the wireless transceiver 104 of the device 100 and that of the second device 202. A pairing may be required prior to data transmission. For example, the device 100 and the second device 202 may have to be paired via Bluetooth or be in the same WiFi network. The location data 400 may be encrypted and/or otherwise secured such that it cannot be easily understood or deciphered. The location data 400 may be encrypted during transmission and decrypted once received. In some embodiments, the data transmission may be via a wired connection. In some embodiments, the data transmission may need a third device (e.g., a personal computer, a tablet, etc.) as an intermediary device to facilitate the data transmission.

In block 504, the processor(s) of the controller 102 of the device 100 may determine that the vehicle 402 is started. The vehicle 402 may be started when the ignition is turned on such that its engine starts running as a result. The vehicle 402 may also be said to be started when a battery of the vehicle 402 begins supplying power to the components of the vehicle 402 with or without the engine running. The vehicle 402 may be started via turning a key, a push of a button, and/or the device 100. The ECU of the vehicle 402 may communicate with the controller 102 of the device 100, wirelessly or wired, that the vehicle 402 is started. The vehicle 402 may have a transceiver coupled to the ECU to wirelessly exchange information with the device 100. The transceiver may include but not be limited to a Bluetooth, an infrared (IR), a radio frequency (RF), or a WiFi based communication hardware. A pairing may be required between the two wireless transceivers. For example, a Bluetooth pairing or being in the same WiFi network may be required. In some embodiments, the vehicle 402 may have an inlet (e.g., a universal serial bus (USB) port) in addition to or in lieu of the wireless transceiver. The inlet may enable the device 100 to be physically inserted and coupled to the vehicle 402 to exchange information. Once it is determined that the vehicle 402 is started, the method may continue with block 506.

In block 506, the processor(s) of the controller 102 of the device 100 may transmit the location data 400 to a navigation system. The navigation system may plan an efficient route passing through each of the locations of the location data 400. The efficiency may be based on, for example, how long it takes to arrive at all of the locations to make stops and complete the trip or how many miles are to be traveled to complete the trip. The transmission of the location data may be wired or wireless. A wireless transmission may be performed via the wireless transceiver 104 of the device 100 and that of the navigation system or a system the navigation system is a component of, such as the vehicle 402. A pairing may be required between the two wireless transceivers. For example, a Bluetooth pairing or being in the same WiFi network may be required. The navigation system may be a portable handheld device or fixed to the vehicle 402. The navigation system may be projected to a display of the portable handheld device or a display 404 of the vehicle 402 (e.g., infotainment unit). A drawn route to the locations and/or pins of the locations may be shown on a map 406 displayed on the display 404. In some embodiments, the navigation system may provide voice directives to the user through speakers. In some embodiments, the device 100 may include a location sensor, and the display 108 or speakers of the device 100 may project directions to the user instead of or in addition to transmitting the location data 400 to another portable device or system with navigation capabilities. Once the navigation system determines a route for the user to take based on the transmitted location data 400, the method may continue with block 508.

In block 508, the user of the device 100 may travel to the locations. The user may follow the mapped route in block 506 via navigation system instructions. In some embodiments, the vehicle 402 may be an autonomous or semi-autonomous vehicle with self-driving capabilities, and the vehicle 402 may drive the user to the locations. The ECU of the vehicle 402 coupled to the navigation system may control the steering and acceleration functions of the vehicle 402 based on the location data 400 and routing of the navigation system. Information regarding conditions that affect driving such as weather, traffic, accidents, and road work may be received by sensors coupled to the ECU and evaluated by the ECU to control the steering and acceleration.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A portable digital access device comprising:
a wireless transceiver configured to exchange information with a plurality of access control devices, the information including key identification data and authentication data, the authentication data having a plurality of keys for one or more of the plurality of access control devices, and the key identification data identifying one or more keys of the plurality of keys corresponding to at least one access control device of the plurality of access control devices;
a memory configured to store the authentication data; and
a processor coupled to the wireless transceiver and the memory, the processor configured to:
determine that the one or more keys match the key identification data received from the at least one access control device;
determine a destination location corresponding to the at least one access control device for navigation in response to the determination that the one or more keys match the key identification data received from the at least one access control device; and transmit the one or more keys to the at least one access control device by controlling the wireless transceiver to prompt the at least one access control device to allow access to a user.

2. The portable digital access device of claim 1 wherein the memory is further configured to store location data including a plurality of locations respectively corresponding to the plurality of access control devices, and the processor is further configured to identify the destination location among the plurality of locations and to transmit data including the destination location to a navigation system by controlling the wireless transceiver to navigate the user to the destination location.

3. The portable digital access device of claim 1 wherein the wireless transceiver is further configured to communicate with one or more servers, the one or more servers configured to store location data including a plurality of locations respectively corresponding to the plurality of access control devices and to transmit the location data to a navigation system to navigate the user to the destination location when the processor determines that the one or more keys match the key identification data.

4. The portable digital access device of claim 1 wherein the at least one access control device is a lock, a ticket reader, a gate, or a direction indicator.

5. The portable digital access device of claim 1 wherein the processor is further configured to transmit the authentication data to other portable digital access devices by controlling the wireless transceiver upon receiving input from the user.

6. The portable digital access device of claim 1 wherein the processor is further configured to receive the authentication data from servers of the plurality of access control devices.

7. The portable digital access device of claim 1 wherein the processor is further configured to set a timer to count to a predetermined time and remove the authentication data from the memory when the timer reaches the predetermined time.

8. A method for obtaining access through a plurality of access control devices comprising:
  receiving, by a wireless transceiver, key identification data from the plurality of access control devices, the key identification data associating a digital key of a plurality of digital keys with a corresponding access control device of the plurality of access control devices;
  determining, by a processor coupled to the wireless transceiver, that at least a portion of authentication data having the plurality of digital keys and stored in a memory coupled to the processor matches the key identification data;
  determining, by the processor, one or more destination locations corresponding to the plurality of access control devices for navigation in response to determining that at least the portion of the authentication data matches the key identification data; and
  transmitting, by the wireless transceiver, at least the portion of the authentication data to the plurality of access control devices to prompt the plurality of access control devices to provide access.

9. The method of claim 8 further comprising inputting, by an input device coupled to the processor, the key identification data and generating, by the processor or one or more servers, the authentication data based on the key identification data.

10. The method of claim 8 further comprising transmitting, by one or more servers, location data of the plurality of access control devices to a navigation system to provide a plurality of directions to the one or more destination locations corresponding to the plurality of access control devices.

11. The method of claim 8 further comprising transmitting, by the wireless transceiver, location data of the plurality of access control devices stored in the memory to a navigation system to provide a plurality of directions to the one or more destination locations corresponding to the plurality of access control devices.

12. The method of claim 8 further comprising transmitting, by the wireless transceiver, location data of the plurality of access control devices to an electronic control unit (ECU) on or within a vehicle with self-driving capabilities and prompting the vehicle to drive, by the ECU, to the one or more destination locations corresponding to the plurality of access control devices.

13. The method of claim 8 further comprising transmitting, by the wireless transceiver, a copy of the authentication data to be used as an access token.

14. The method of claim 8 further comprising setting a timer, by the processor, to count to a predetermined time and removing the authentication data from the memory when the timer reaches the predetermined time.

15. A method for accessing a plurality of areas comprising:
  receiving, by a wireless transceiver, location data of the plurality of areas;
  storing, by a memory, the location data;
  determining, by a processor coupled to the wireless transceiver and the memory, that a vehicle is started;
  receiving, by the wireless transceiver, key identification data related to at least one area of the plurality of areas;
  obtaining, by the processor, authentication data;
  determining, by the processor, one or more destination locations corresponding to the plurality of areas in response to determining that at least a portion of the authentication data matches the key identification data; and
  transmitting, by the wireless transceiver, the location data to a navigation system when the vehicle is started to navigate the vehicle to the one or more destination locations corresponding to the plurality of areas.

16. The method of claim 15 further comprising receiving, by the wireless transceiver, one or more access tokens for one or more areas of the plurality of areas having one or more access control devices, storing, by the memory, the one or more access tokens, and transmitting, by the wireless transceiver, the one or more access tokens to the one or more access control devices to gain access.

17. The method of claim 15 further comprising receiving, by the wireless transceiver, one or more access tokens for one or more access control devices, storing, by the memory, the one or more access tokens, and transmitting, by the wireless transceiver, the one or more access tokens to the one or more access control devices to gain access.

18. The method of claim 17 wherein the one or more access control devices is a lock, a ticket reader, a gate, or a direction indicator.

19. The method of claim 15 wherein the vehicle has self-driving capabilities and the navigation system is coupled to an electronic control unit (ECU) on or within the vehicle, and the method further comprises initiating, by the processor, the vehicle to drive, by the ECU, to the one or more destination locations corresponding to the plurality of areas based on the location data.

20. The method of claim 15 further comprising transmitting, by the wireless transceiver, the location data to one or more portable devices capable of storing the location data and transmitting the location data to other navigation systems.

* * * * *